United States Patent [19]

Meyer

[11] Patent Number: 4,966,196
[45] Date of Patent: Oct. 30, 1990

[54] BALANCED SERVO-OPERATED MULTIWAY VALVE

[75] Inventor: Ernst-August Meyer, Algermissen, Fed. Rep. of Germany

[73] Assignee: WABCO Westinghouse Steuerungstechnik GmbH & Co., Hanover, Fed. Rep. of Germany

[21] Appl. No.: 448,878

[22] Filed: Dec. 12, 1989

[30] Foreign Application Priority Data

Dec. 17, 1988 [DE] Fed. Rep. of Germany ....... 3842633

[51] Int. Cl.$^5$ ............................................. F15B 13/043
[52] U.S. Cl. ............................... 137/625.64; 137/269; 137/625.6; 251/26
[58] Field of Search .................. 137/269, 270.5, 625.6, 137/625.64; 251/26

[56] References Cited

U.S. PATENT DOCUMENTS

| | | | |
|---|---|---|---|
| 2,925,984 | 2/1960 | Kowalski | 251/26 |
| 4,257,572 | 3/1981 | Neff | 137/625.64 X |
| 4,491,155 | 1/1985 | Meyer et al. | 137/625.66 |
| 4,627,597 | 12/1986 | Brausfeld et al. | 137/625.65 X |
| 4,627,597 | 12/1986 | Brausfeld et al. | |

FOREIGN PATENT DOCUMENTS

1249040 8/1967 Fed. Rep. of Germany .
3224955 5/1984 Fed. Rep. of Germany .

OTHER PUBLICATIONS

Wabco Westinghouse Steuerungstechnik Industrie—Programm Catalog (undated).
Article entitled "Designing and Developing a Modern Pneumatic Valve", Power, May 1979, p. 205.

*Primary Examiner*—Gerald A. Michalsky
*Attorney, Agent, or Firm*—Buchanan Ingersoll

[57] ABSTRACT

A servo-operated multiway valve is disclosed which can be optionally used as both a pressurization valve and a ventilation valve for use with a fluid consuming device. The valve utilizes a valve body to allow fluid communication alternatively between two inlet/vent fluid chambers and an outlet fluid chamber disposed along a central bore, in which the valve body is located. The device utilizes a servo to displace the valve body of the multiway valve. Fluid may be introduced to the valve through either of two inlet/vent chambers, to alternatively allow fluid to flow to the outlet chamber in the resting or the activated mode of the servo. The servo is in fludi communication with the selected inlet chamber at all times, and does not communicate with the selected vent chamber. This is achieved through the use of dual passages, connecting each of the inlet/vent chambers to the servo. Fluid flows from the appropriate inlet chamber to the servo, through the associated passage. A check valve in each passage prevents backflow between the servo and the associated chamber, when that chamber is functioning as a vent.

13 Claims, 1 Drawing Sheet

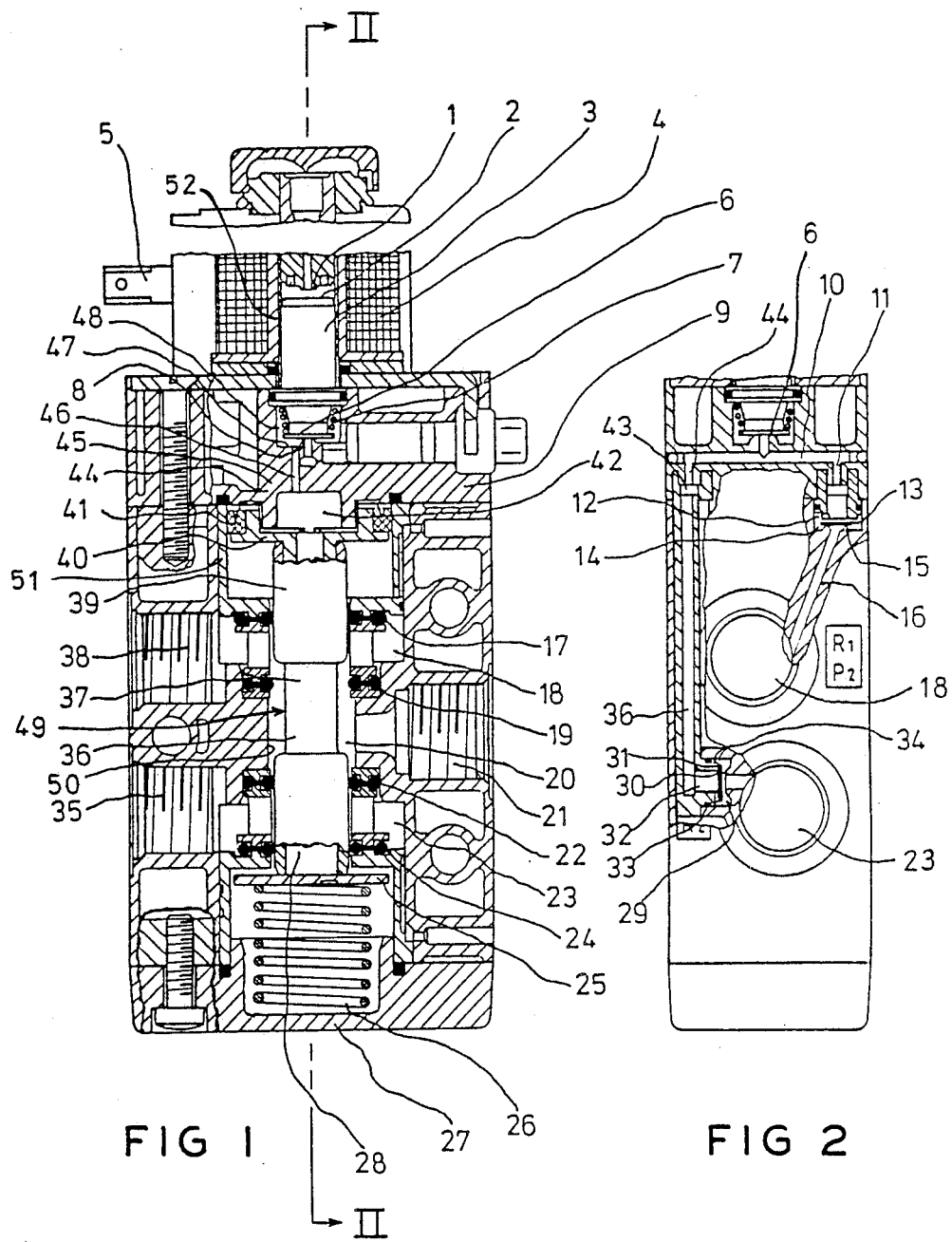

BALANCED SERVO-OPERATED MULTIWAY VALVE

BACKGROUND OF THE INVENTION

1. Field of the Invention

The present invention relates to a multiway valve for use with a hydraulic or pneumatic device. More specifically, the invention relates to a multiway valve which can be operated by a servo valve, and which may be utilized to operate a fluid device in both a resting and an activated mode.

2. Description of the Prior Art

Multiway slide valves are well known in the art for the operation of fluid based machinery. One such valve is disclosed in U.S. Pat. No. 4,491,155, issued Jan. 1, 1985, which is hereby incorporated into this specification by reference. This valve utilizes a sliding valve body having a recessed land at its center. Three ports with associated fluid chambers are disposed along a central bore, in which the valve body is slidably located. Sealing rings separate each of the chambers. In operation, the valve body is moved such that the recessed land is displaced from a central position toward one of the two extreme positions. This allows fluid communication across the land between the center fluid chamber and one of the end fluid chambers.

Servo operated valves are also well known. U.S. Pat. No. 4,627,597, issued Dec. 9, 1986, discloses a balanced servo valve with optional manual activation for mounting on a multiway valve. The specification of U.S. Pat. No. 4,627,597 is also hereby incorporated into this specification by reference. The servo valve has an inlet and an outlet port which are separated by a valve body. The valve body is held in the closed position, relative to the inlet and outlet ports, by a spring. The valve body is surrounded by a coil, which when activated moves the valve body against the spring and allows fluid communication between the inlet and the outlet ports.

A servo-operated, multiway valve has also been developed, and is illustrated in various catalogs of WABCO Westinghouse Fahrzeugbremsen GmbH, including Steuerungstechnik, Gerät 572, October 1976. This device utilizes the servo valve to displace the sliding valve body of the multiway valve. The first, or inlet chamber introduces fluid to the multiway valve. The second, or outlet chamber is connected to a fluid-operated device, and allows the fluid to pass to the device. The third, or vent chamber serves as a return to tank or as a vent to the atmosphere.

The servo valve is connected to the multiway valve through two passages. The first is continuously connected with the inlet chamber of the multiway valve and allows fluid to pass to the servo valve. The second leads from the servo to a control chamber within the multiway valve. The control chamber, when charged with fluid, displaces the multiway valve body from its resting position. The fluid flow from the servo to the control chamber is blocked by the servo valve body in the resting position.

When the servo valve is activated, it allows fluid to flow from the first servo passage into the second servo passage, and from there into the multiway valve. This pressurizes the control chamber in the multiway valve. The fluid introduced into the control chamber displaces the multiway valve body, such that the inlet chamber is closed off from the outlet chamber which feeds the consumer device. The outlet chamber is then connected with the vent chamber, which serves as a pressure exit chamber. In such a design and switching mode, the multiway valve has the function of a fluid-escape valve, as the fluid consuming device is in communication with the fluid source when the valve is at rest.

If such a multiway valve is to be used as a ventilating valve, structural modifications must be made to the multiway valve. In such an embodiment, the fluid actuated device is not in communication with the fluid source in the resting position. The chambers are reversed in order along the valve body, so that the former vent chamber, which was closed off from the outlet chamber at rest, becomes the inlet chamber. In a like manner, the former inlet chamber, which was in communication with the outlet chamber at rest, becomes the vent chamber. At rest, fluid is introduced to the inlet chamber, and the outlet chamber and vent chambers are in communication with the atmosphere or a fluid return.

When the servo is activated, the multiway valve body is displaced, so that the inlet chamber is in communication with the outlet chamber, and fluid flows to the consuming device. In order for such an embodiment to operate properly, the multiway valve must be modified structurally from its first embodiment. A passage must be made between the vent chamber of the first embodiment, which becomes the inlet chamber of the second embodiment, and the servo. This is to provide a continuous source of fluid to the servo. Additionally, the inlet chamber of the first embodiment, which has become the vent chamber in the second embodiment, may not have any connection to the servo chamber.

If one wishes to construct a pressure medium-actuatable device so that ventilation or pressurization of this device are both optionally possible when the servo valve is actuated, it is necessary to employ two servo-operated multiway valves. One of each of the above described embodiments must be utilized. As stated, these multiway valves differ in that the first chamber in the case of one multiway valve and the third chamber in the case of the second multiway valve must have a continuous connection to the entrance chamber of the assigned servo valve. It is thus necessary to provide a separate servo-operated multiway valve for each application purpose.

What is lacking in the art, therefore, is a single valve which can be utilized optionally to operate a fluid device in both its resting and activated modes, without modification.

SUMMARY OF THE INVENTION

A servo-operated multiway valve is disclosed which can be optionally used as both a pressurization valve and a ventilation valve. Like the valve described in the catalog above, a multiway valve is combined with a servo operator. The valve utilizes a sliding valve body having a recessed land at its center. Three ports with associated fluid chambers are disposed along a central bore, in which the valve body is slidably located. Sealing rings separate each of the chambers. In operation, the valve body is moved such that the recessed land is displaced from a central position toward one of the two extreme positions. This allows fluid communication across the land between the center fluid chamber and one of the end fluid chambers.

The device further utilizes a servo valve to displace the sliding valve body of the multiway valve. The servo valve is connected to a control chamber within the multiway valve. This chamber, when charged with fluid, displaces the multiway valve body from a resting position to an activated position. The servo is charged with fluid from an entrance chamber, located between the servo and the multiway valve. Two fluid passages pass to this entrance chamber, one from each of the two inlet/vent chambers in the multiway valve. These passages provide a fluid source for the servo to charge the control chamber of the multiway valve. Check valves are positioned in each of these passages to provide for one-way fluid movement.

The two embodiments described above are thus combined in this single valve. Fluid may be introduced through either of the two inlet/vent chambers and vented through the other. As the entrance chamber is in communication with both of these inlet/vent chambers, fluid will flow to the servo through the passage associated with the particular chamber being utilized as an inlet. The other passage, by its check valve, will prevent the backflow of fluid from the entrance chamber to the chamber operating as a vent. As before, the fluid consuming device is connected to the valve through the outlet chamber.

In particular, when the servo valve is at rest, and the valve is functioning as a pressurizing valve, fluid flows from a reservoir to an inlet port, and from there across the multiway valve body to the outlet chamber and the device. Fluid also flows through the passage from this inlet chamber to the entrance chamber of the servo. The servo, in its resting position, prevents the flow of this fluid to the control chamber of the multiway valve, and the multiway valve body remains at rest. The third chamber of the multiway valve is vented to atmosphere or return. The passage from this vent chamber is blocked by the check valve therein, and prevents fluid backflow from the entrance chamber to the vent chamber.

When the servo is activated, the servo valve body is displaced and fluid from the entrance chamber is passed through to the control chamber of the multiway valve body. The multiway valve body is displaced, and the fluid flow from the inlet chamber to the outlet chamber is interrupted. The outlet chamber is then connected to the vent chamber.

The fluid flow pattern may then be reversed on the same multiway valve, having the fluid flow to an inlet port which is cut off from the outlet chamber in the rest position of the multiway valve body. The outlet chamber is connected with the vent chamber. Fluid flows from the inlet chamber to the entrance chamber of the servo through a passage therebetween. Fluid flow from the entrance chamber to the vent chamber through the passage therebetween is blocked by the check valve in the passage.

The invention offers the advantage in particular that all that is necessary for a change in function is to connect a line coming from the pressure source either to the first chamber or to the third chamber, and to use the other chamber as a fluid escape connection or as a reflux connection.

These and other advantages and features of the present invention will be more fully understood on reference to the presently preferred embodiments thereof and to the appended drawings.

BRIEF DESCRIPTION OF THE DRAWINGS

FIG. 1 is a cross-sectional view in partial fragmentation of the servo operated multiway valve.

FIG. 2 is an elevational sectional view, partly in fragmentation of the device illustrated in FIG. 1, taken along line II—II.

DESCRIPTION OF THE PREFERRED EMBODIMENTS

In FIG. 1, a multiway valve housing 27 is shown having a servo valve housing 9 mounted at one end. The multiway housing 27 has three chambers disposed along a central bore 50. A multiway valve body 49 is slidably located within the central bore 50. A first chamber, which serves as an inlet/vent chamber 18 is the uppermost chamber along the central bore 50, as viewed in FIG. 1. This first inlet/vent chamber 18 is connected to first inlet/vent port 38, which allows for external fluid communication to or from first inlet/vent chamber 18. Moving along the central bore in a downward direction, as viewed in FIG. 1, a second chamber, serving as the outlet chamber 20 is centrally located in the multiway valve body 27. This outlet chamber 20 is connected to outlet port 21, and also allows for external fluid communication to or from outlet chamber 20. Outlet chamber 20 and outlet port 21 are preferentially adapted to allow fluid communication to a fluid consuming device (not shown). A third chamber, serving as the second inlet/vent chamber 23, is the most downwardly disposed of the chambers along central bore 50, as viewed in FIG. 1. This chamber is connected to a second inlet/vent port 35, allowing for external fluid communication to or from second inlet/vent chamber 23.

The chambers are separated from each other along the multiway valve body 49 by sealing inserts, which are preferentially ring-shaped. Beginning at the uppermost end of the multiway valve body 49, as viewed in FIG. 1, a first sealing insert 17 and a second sealing insert 19 provide for fluid retention in the first inlet/vent chamber 18. Second sealing insert 19 and third sealing insert 22 limit fluid flow to or from the outlet chamber 20, while third sealing insert 22 and fourth sealing insert 24 define the second inlet/vent chamber 23. The four sealing inserts are preferably provided with an outer and an inner packing ring, and are located in between the stepped stages of central bore 50.

The multiway valve body 49 consists of a cylindrical component provided with a constriction or land 37, where the valve body end sections 28 and 39 extending from the land 37 have an outside diameter that matches the inside diameter of the inner packing rings of the sealing inserts 17, 19, 22 and 24. These sealing inserts 17, 19, 22 and 24 form a sliding valve with multiway valve body 49, which is arranged coaxially to the sealing inserts 17, 19, 22 and 24 and which is installed in the direction of the longitudinal axis of the sealing inserts 17, 19, 22 and 24, movable relative thereto.

The second sealing insert 19 forms a first valve with the valve body end section 39 of the multiway valve body 49. This valve permits or prevents fluid communication between first inlet/vent chamber 18 and outlet chamber 20. The third sealing insert 22 forms a second valve with the valve body end section 28 of the multiway valve body 49. This valve permits or prevents fluid communication between the outlet chamber 20 and the second inlet/vent chamber 23.

The multiway valve body 49 is acted upon by a spring 26, supported on the bottom, as viewed in FIG. 1, of the multiway valve housing 27. This spring holds the multiway valve body 49 in its resting position, and serves as the restoring force for the multiway valve body 49 after any displacement thereof. Spring plate 25 is interposed between spring 26 and multiway valve body 49 and provides a stop against multiway valve housing 27. The spring 26 is adapted to move the multiway valve body 49 in the direction of the servo valve housing 9.

The multiway valve body 49, while in its resting position as shown which is its uppermost position as viewed in FIG. 1, allows fluid communication between the first inlet/vent chamber 18 and the outlet chamber 20 while preventing fluid communication between outlet chamber 20 and second inlet/vent chamber 23. Displacement of multiway valve body 49 in a downward direction, as viewed in FIG. 1, cuts off fluid communication between first inlet/vent chamber 18 and outlet chamber 20 and allows fluid flow between outlet chamber 20 and second inlet/vent chamber 23. This displacement of the multiway valve body is controlled through the use of a servo valve mounted on the multiway valve.

A control piston 40 is located at one end of the multiway valve body 49, which is the uppermost end, as viewed in FIG. 1. This control piston 40 is movable within control piston cylinder 51, and displaces multiway valve body 49 therewith. The control piston 40 is preferably generally U-shaped, and the "cup" of the U is directed away from the multiway valve body 49. A control piston packing ring 41, interposed between the control piston 40 and control piston cylinder 51 is supported in a circumferential groove on the control piston 40, and serves to prevent fluid flow from one side of the control piston 40 to the other. Control piston cylinder 51 is located in the uppermost surface of the multiway valve housing 27, as viewed in FIG. 1, and is open to the undersurface of the servo valve housing 9, when such housing is mounted on the multiway valve housing 27.

A control chamber 42 is located in the lowermost portion of servo valve housing 9, as viewed in FIG. 1. It is adapted to provide external fluid communication to or from the servo valve. Control chamber 42 is in direct fluid communication with control piston cylinder 51, when servo valve housing 9 is mounted on multiway valve housing 27.

Servo-valve housing 9 is mounted on the uppermost surface of multiway valve housing 27, as viewed in FIG. 1. The servo valve is designed as an electrical solenoid valve. The servo valve has an inlet valve formed by a first servo valve seat 8 an inlet face 6 of a servo valve body 3. A second servo valve seat 1 and the opposite, or outlet face 2 of servo valve body 2 form an outlet valve. Servo valve body 3 is slidably located in a guide tube 52, contained within an electrical coil 4. The servo valve body 3 is slidable in the direction of the longitudinal axis of the guide tube 52. The servo valve body 3 is held in a resting position by a servo spring 7. This resting position is downwardly, as viewed in FIG. 1, and closes off fluid communication across first servo valve seat 8. When coil 4 is activated by electricity provided through coil electrical connections 5 (only one shown), servo valve body 3 is displaced in an upward manner, as viewed in FIG. 1, allowing fluid communication across first servo valve seat 8 and closing off fluid communication across second servo valve seat 1.

First servo valve seat 8 is located in servo outlet chamber 48, and serves as an inlet for the chamber allowing fluid to pass to servo outlet channel port 47, servo outlet channel 46, and ultimately to control chamber 42. Fluid is provided to servo outlet chamber 48 from entrance chamber 10.

As shown in FIG. 2, the entrance chamber 10 for the servo valve is located in the servo valve housing 9. The entrance chamber 10 can, however, also be located directly in the multiway valve housing 27 or in the servo valve housing 9. The entrance chamber 10 is connected to both the first inlet/vent chamber 18 and the second inlet/vent chamber 23 through first and second fluid passages 16 and 36, respectively. These first and second fluid passages allow fluid communication from the inlet/vent chambers to the entrance chamber, and ultimately to the control chamber 42.

A first check valve 13-15 is located between the first inlet/vent chamber 18 and the entrance chamber 10. The check valve is open in one direction only. The first check valve allows fluid flow from first inlet/vent chamber 18 to entrance chamber 10, and prevents fluid flow from entrance chamber 10 to first inlet/vent chamber 18. The first check valve consists of a check valve seat 15 located in the multiway valve housing 27 and a tapered bore-mounted check valve body 13. The check valve body 13 subdivides the check valve chamber into a first check valve chamber 14 and a second check valve chamber 12. The first check valve chamber 14 is connected through first fluid passage 16 in multiway valve housing 27 to the first inlet/vent chamber 18. The second check valve chamber 12 is connected through a first entrance chamber fluid passage 11 to entrance chamber 10.

A second check valve 30-31 is provided between the second inlet/vent chamber 23 and the entrance chamber 10. The second check valve is also open in one direction only. The second check valve allows fluid flow from the second inlet/vent chamber 23 to entrance chamber 10, and prevents fluid flow from entrance chamber 10 to second inlet/vent chamber 23. The second check valve has a valve seat 30 located in the area of the second inlet/vent chamber 23 and a tapered bore-mounted check valve body 31. The check valve body 31 subdivides the valve chamber into a first check valve chamber 29 and a second check valve chamber 34. The first check valve chamber 29 is connected with the second inlet/vent chamber 23. The second check valve chamber 34 is connected through a fluid connection 32 and second fluid passage 36 to a fluid chamber 43 and second entrance chamber fluid passage 44. Second entrance chamber fluid passage 44 allows fluid flow into the entrance chamber 10.

In the first mode of usage, it is assumed that the first inlet/vent port 38 is connected with a pressure medium, fluid, source and the outlet port 21 is connected to a fluid consuming device. The second inlet/vent port 35 serves in this case as a fluid outlet, leading to the atmosphere. Thus first inlet/vent chamber 18 is serving as an inlet chamber, and second inlet/vent chamber 23 is serving as a vent chamber.

In the position shown, the first valve of the multiway valve body 49 is serving as the inlet valve. It provides for fluid communication between the first inlet/vent chamber 18 and outlet chamber 20, and is open in the illustrated resting position. The second valve of the multiway valve body 49 is serving as the outlet valve. It provides for fluid communication between the outlet chamber 20 and the second inlet/vent chamber 23, and is closed at rest.

The fluid serving as the control pressure from the first inlet/vent chamber 18 is present in the entrance chamber 10 through the channel 46 and the first check valve 13-15. The first check valve is held in the open position by the pressure medium in the first inlet/vent chamber 18 in the direction of the entrance chamber 10. Pressure medium passes from the entrance chamber 10 through the second entrance chamber fluid passage 44, the fluid chamber 43, the second fluid passage 36 and the fluid connection 32 into the second check valve chamber 34 of the second check valve and acts on the check valve body 31 in the closure direction of the second check valve. The entrance chamber 10 and the second inlet/vent chamber are now closed off with respect to each other.

In the resting position, the coil 4, which is designed as a solenoid valve, is not excited. The servo valve body 3 is held in a downward position, as viewed in FIG. 1, cutting off the flow of fluid from entrance chamber 10 through first servo valve seat 8 with the inlet face 6 of the servo valve body.

If a voltage is imposed on the contact 5 and coil 4 is excited, the servo valve body 3 moves against the force of the servo spring 7 in the direction of the second servo valve seat 1. Fluid under pressure passes from the entrance chamber 10 through the now open first servo valve seat 8 into the servo outlet chamber 48. The fluid passes through servo outlet channel 46 and into the control chamber 42. Under the action of pressure buildup in the control chamber 42, the control piston 40 and also the multiway valve body 49 connected therewith are moved away from the servo, against the force of spring of the spring 26 in a downward direction, as viewed in FIG. 1.

The inlet valve of the multiway valve body passes into the closed position and the outlet valve of the multiway valve body is opened. The first inlet/vent chamber 18 and the outlet chamber 20 are now closed off against each other so that the connection of the fluid source to the fluid consuming device is interrupted. Because the outlet chamber 20 is now connected with the second inlet/vent chamber 23, the fluid consuming device is vented to the atmosphere through the outlet chamber 20, the open outlet valve, the second inlet/vent chamber and the second inlet/vent port.

If the servo-operated multiway valve is used in a hydraulically driven installation or device, the second inlet/vent port 35, connected with the second inlet/vent chamber 23 is connected with a return.

If fluid pressure medium is again to be admitted into the consuming device, the voltage is removed or the current interrupted from the coil 4. The servo valve body 3 moves again to its resting position, moved by servo spring 7. Inlet face 6 of the servo valve body 3 closes off fluid flow through first servo valve seat 8, and fluid pressure from control chamber 42 is passed back into outlet chamber 48, and through servo valve body 3 to second servo valve seat 1. This allows multiway valve body 49 to move back to its resting position with the force of spring 26. The outlet valve of multiway valve body 49 goes into the closed position as the fluid communication between the outlet chamber 20 and the second inlet/vent chamber 23 is closed off. The inlet valve of the multiway valve body goes into the open position as the fluid communication is restarted between the first inlet/vent chamber 18 and the outlet chamber 20.

If the servo-operated multiway valve is to be used as a pressurizing valve, as opposed to a ventilating valve, the pressurized fluid is fed to the second inlet/vent chamber 23, which is serving as an inlet valve. In the resting position of the valve, the outlet chamber 20 is vented to the atmosphere or return through first inlet/vent valve 18, which is serving as a vent. In this embodiment, the second inlet/vent port 35 is connected with the pressure medium source. The first inlet/vent port 38 then leads to the atmosphere.

The outlet valve is now located at the interface between outlet chamber 20 and first inlet/vent chamber 18, along multiway valve body 49, and the inlet valve is formed at the interface between outlet chamber 20 and second inlet/vent chamber 23. In the resting position, the outlet valve is in the open position so that the consuming device is connected with the atmosphere through the outlet chamber 20, the first inlet/vent chamber 18 and the first inlet/vent port 38. The inlet valve, in the resting position, is closed and the fluid pressure cannot pass from the second inlet/vent, the device is thus not supplied with pressurized fluid.

Fluid is present in the entrance chamber 10 through the second check valve 30-31, which is opened by the pressure medium in the second inlet/vent chamber 23, the fluid connection 32, the second fluid passage 36, the fluid chamber 43 and the second entrance chamber fluid passage 44. The first check valve is acted upon by pressure medium in the entrance chamber 10 in the direction of closure, so that the entrance chamber 10 is shut off against the first inlet/vent chamber 18.

If a voltage is imposed on the connection 5, the servo valve body 3 moves against the force of the servo spring 7 in the direction of the second servo valve seat 1. Pressure medium passes from the entrance chamber 10 through the now open first servo valve seat 8 into the servo outlet chamber 48. The fluid passes through servo outlet channel 46 and into the control chamber 42. Under the action of pressure buildup in the control chamber 42, the control piston 40 and also the multiway valve body 49 connected therewith are moved away from the servo, against the force of spring of the spring 26 in a downward direction, as viewed in FIG. 1.

The inlet valve of the multiway valve body passes into the open position and the outlet valve of the multiway valve body is closed. The first inlet/vent chamber 18 and the outlet chamber 20 are now closed off against each other. Because the outlet chamber 20 is now connected with the second inlet/vent chamber 23, the fluid consuming device is charged with fluid from the pressure medium source.

If the servo-operated multiway valve is used in a hydraulically driven installation or device, the port connected with the chamber is connected with a return.

If pressure medium is to be shut off from the consuming device, the voltage is removed from the coil 4. The servo valve body 3 moves again to its resting position, moved by servo spring 7. Inlet face 6 of the servo valve body 3 closes off fluid flow through first servo valve seat 8, and fluid pressure from control chamber 42 is passed back into outlet chamber 48, and through servo valve body 3 to second servo valve seat 1. This allows multiway valve body 49 to move back to its resting position with the force of spring 26. The inlet valve of multiway valve body 49 goes into the closed position as the fluid communication between the outlet chamber 20 and the second inlet/vent chamber 23 is closed off. The outlet valve of the multiway valve body goes into the open position as the fluid communication is restarted between the first inlet/vent chamber 18 and the outlet chamber 20.

The multiway valve can be designed as a sliding valve, as in this embodiment example, but also as a double-seat valve, or other known valve types. The entrance chamber 10 can be connected through the second check valve with both the second inlet/vent chamber 23 and the first inlet/vent chamber 18. The entrance chamber 10 can be shut off against the second inlet/vent chamber 23 or the first inlet/vent chamber 18. Likewise, the entrance chamber 10 can be connected through the first check valve with the first inlet/vent chamber 18 and with the second inlet/vent chamber 23 and/or the entrance chamber 10 can be shut off against the first inlet/vent chamber 18 or the second inlet/vent chamber 23. The check valves can be constructed as attachable plastic components.

While I have described a present preferred embodiment of the invention, it is to be distinctly understood that the invention is not limited thereto but may be otherwise embodied and practiced within the scope of the following claims.

I claim:

1. An improved servo operated multiway valve of the type having:
   (a) a central bore;
   (b) a first fluid pressure connection connected with a first fluid chamber located along the central bore;
   (c) a second fluid connection connected with second fluid chamber located along the central bore;
   (d) a third fluid connection connected with a third fluid chamber located along the central bore;
   (e) first valve means, through which the second fluid chamber may be selectively connected with the first fluid chamber and the third fluid chamber;
   (f) a control piston in fluid communication with a control chamber the control piston moveable by pressure in the control chamber and engagable with the first valve means; and
   (g) second valve means for controlling the fluid pressure in the control chamber;
   the improvement comprising:
   (i) a first check valve located between the second valve means and the first fluid chamber connecting the second valve means and the first fluid chamber when fluid pressure is present in the first fluid chamber;
   (ii) a second check valve located between the second valve means and the third fluid chamber connecting the second valve means and the third fluid chamber when fluid pressure is present in the third fluid chamber, the first and second check valves arranged to supply fluid to the second valve means from the highest respective pressure and to isolate the second valve means from the lower pressure.

2. An improved servo operated multiway valve as claimed in claim 1 wherein the multiway valve is a slide valve.

3. An improved servo operated multiway valve as claimed in claim 1 wherein the second valve is an electrically operated solenoid valve.

4. An improved servo operated multiway valve as claimed in claim 1 wherein the first and second check valves are attachable plastic components.

5. An improved servo-operated multiway valve comprising a valve having a plurality of:
   (a) inlet/vent chambers;
   (b) first valve means for selectively communicating said inlet/vent chambers with at least one outlet chamber;
   (c) fluid operative servo valve means for controlling said first valve means;
   (d) communication passage means for supplying fluid to said servo valve means;
   (e) at least one fluid communication passage from each of the inlet/vent chambers to the servo valve means; and
   (f) a check valve located in each fluid communication passage between the servo valve means and each inlet/vent chamber, such that when fluid pressure is present in each inlet/vent chamber, fluid flow is permitted from that chamber to the servo valve means and fluid flow is prevented from the servo valve means to that inlet/vent chamber when fluid pressure is not present in that inlet/vent chamber.

6. An improved servo-operated multiway valve as claimed in claim 5, further comprising biasing means, biasing the first valve means into a first position.

7. An improved servo-operated multiway valve as claimed in claim 6, wherein the servo valve means exerts a force on the valve means, the force being of sufficient magnitude to overcome the force of the biasing means.

8. An improved servo-operated multiway valve as claimed in claim 5, wherein the check valves are comprised of two check valve chambers separated by a bore mounted check valve body, the first check valve chamber in fluid communication with the servo valve means, and the second check valve member in fluid communication with the associated inlet/vent chamber.

9. An improved servo-operated multiway valve as claimed in claim 5, wherein said communication passage means further comprises a fluid entrance chamber, located between and in fluid communication with the servo valve means and the inlet/vent chambers.

10. An improved servo-operated multiway valve as claimed in claim 9, wherein the check valves are comprised of two check valve chambers separated by a bore mounted check valve body, the first check valve chamber in fluid communication with the entrance chamber, and the second check valve member in fluid communication with the associated inlet/vent chamber.

11. An improved servo-operated multiway valve as claimed in claim 5, wherein said servo valve means further comprises a control chamber, located between and in fluid communication with the servo valve means and the first valve means, the control chamber adapted to accept fluid output from the servo valve means, wherein fluid pressure in the control chamber is utilized to displace the first valve means from a first position to a second position.

12. An improved servo-operated multiway valve as claimed in claim 11, further comprising a control piston affixed to the first valve means and slidably located in a control cylinder such that movement of the control piston in the control cylinder results in displacement of the first valve means; and wherein fluid from the control chamber is passed to the control piston cylinder and is utilized to slide the control piston and thereby displace the first valve means.

13. An improved servo-operated multiway valve as claimed in claim 5, wherein the servo valve means is an electrically-operated solenoid valve.

* * * * *

UNITED STATES PATENT AND TRADEMARK OFFICE
CERTIFICATE OF CORRECTION

PATENT NO. : 4,966,196

DATED : October 30, 1990

INVENTOR(S) : ERNST-AUGUST MEYER

It is certified that error appears in the above-identified patent and that said Letters Patent is hereby corrected as shown below:

Title page:

At 57, Abstract, line 13, change "fludi" to --fluid--.

Signed and Sealed this

Eighteenth Day of February, 1992

Attest:

HARRY F. MANBECK, JR.

*Attesting Officer*      *Commissioner of Patents and Trademarks*